US006914696B1

(12) United States Patent
Kojima et al.

(10) Patent No.: US 6,914,696 B1
(45) Date of Patent: Jul. 5, 2005

(54) IMAGE FORMING APPARATUS

(75) Inventors: Takeo Kojima, Kawasaki (JP); Yoshihiro Watanabe, Kawasaki (JP); Fumihiro Itoh, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 696 days.

(21) Appl. No.: 09/667,714

(22) Filed: Sep. 22, 2000

(30) Foreign Application Priority Data

Nov. 1, 1999 (JP) .......................................... 11-311308

(51) Int. Cl.[7] .......................... G06F 15/00; G03G 15/00

(52) U.S. Cl. ....................... 358/1.16; 358/1.14; 399/24; 399/25; 399/27

(58) Field of Search ....................... 399/24–28; 358/1.9, 358/1.14, 1.15, 1.16; 347/7; 714/47

(56) References Cited

U.S. PATENT DOCUMENTS

| | | | | |
|---|---|---|---|---|
| 5,101,233 A | | 3/1992 | Ito et al. | |
| 5,636,032 A | * | 6/1997 | Springett | 358/296 |
| 5,802,420 A | * | 9/1998 | Garr et al. | 399/27 |
| 6,173,129 B1 | * | 1/2001 | Kimizuka | 399/25 |
| 6,430,711 B1 | * | 8/2002 | Sekizawa | 714/47 |

FOREIGN PATENT DOCUMENTS

| | | | | |
|---|---|---|---|---|
| EP | 919392 A1 | * | 6/1999 | B41J/29/393 |

* cited by examiner

*Primary Examiner*—Edward Coles
*Assistant Examiner*—Chan S. Park
(74) *Attorney, Agent, or Firm*—Westerman, Hattori, Daniels & Adrian, LLP

(57) ABSTRACT

In a image forming apparatus, a lifespan copy number (lifespan time period) previously determined for each component is added to the replacement schedule copy number (replacement schedule time) of respective components contained in the apparatus, in other words the total print number (total print time) at the time of replacement of a component, and the resulting value is recorded in a non-volatile memory. Therefore, it is judged that a component lifespan has expired, each time that the total print number (total print time) exceeds the replacement schedule copy number (replacement schedule time period). Thereby, since the amount of information required for component lifespan management is small, the capacity of the non-volatile memory can be reduced, and hence cost reductions in the image forming apparatus can be achieved.

4 Claims, 12 Drawing Sheets

Initial (0 × M + 0)

| | Value |
|---|---|
| Total Print Number Count (Upper) 1 | 0 |
| Total Print Number Count (Upper) 2 | 0 |
| Total Print Number Count (Upper) 3 | 0 |
| Total Print Number Count (Lower) 0 | 0 |
| Total Print Number Count (Lower) 1 | 0 |
| ⋮ | |
| Total Print Number Count (Lower) N | 0 |

FIG. 4A

After Printing One Copy (0 × M + 1)

| | Value |
|---|---|
| Total Print Number Count (Upper) 1 | 0 |
| Total Print Number Count (Upper) 2 | 0 |
| Total Print Number Count (Upper) 3 | 0 |
| Total Print Number Count (Lower) 0 | 1 |
| Total Print Number Count (Lower) 1 | 0 |
| ⋮ | |
| Total Print Number Count (Lower) N | 0 |

FIG. 4B

After Printing M-1 Copies (0 × M + (M-1))

| | Value |
|---|---|
| Total Print Number Count (Upper) 1 | 0 |
| Total Print Number Count (Upper) 2 | 0 |
| Total Print Number Count (Upper) 3 | 0 |
| Total Print Number Count (Lower) 0 | M−1 |
| Total Print Number Count (Lower) 1 | 0 |
| ⋮ | |
| Total Print Number Count (Lower) N | 0 |

FIG. 4C

After Printing M Copies (1 × M + 0)

| | Value |
|---|---|
| Total Print Number Count (Upper) 1 | 1 |
| Total Print Number Count (Upper) 2 | 1 |
| Total Print Number Count (Upper) 3 | 1 |
| Total Print Number Count (Lower) 0 | 0 |
| Total Print Number Count (Lower) 1 | 0 |
| ⋮ | |
| Total Print Number Count (Lower) N | 0 |

FIG. 4D

After Printing N × M-1 Copies

| | Value |
|---|---|
| Total Print Number Count (Upper) 1 | N−1 |
| Total Print Number Count (Upper) 2 | N−1 |
| Total Print Number Count (Upper) 3 | N−1 |
| Total Print Number Count (Lower) 0 | 0 |
| Total Print Number Count (Lower) 1 | 0 |
| ⋮ | |
| Total Print Number Count (Lower) N | M−1 |

FIG. 4E

After Printing N × M Copies

| | Value |
|---|---|
| Total Print Number Count (Upper) 1 | N |
| Total Print Number Count (Upper) 2 | N |
| Total Print Number Count (Upper) 3 | N |
| Total Print Number Count (Lower) 0 | 0 |
| Total Print Number Count (Lower) 1 | 0 |
| ⋮ | |
| Total Print Number Count (Lower) N | 0 |

FIG. 4F

FIG. 5

| Print Number | Total Print Number Counter (Lower) | | | | | | | |
|---|---|---|---|---|---|---|---|---|
| | 0 | 1 | 2 | 3 | 4 | 5 | ~ | N−1 |
| M×0~M×1−1 | ○ | | | | | | | |
| M×1~M×2−1 | | ○ | | | | | | |
| M×2~M×3−1 | | | ○ | | | | | |
| M×3~M×4−1 | | | | ○ | | | | |
| M×4~M×5−1 | | | | | ○ | | | |
| M×5~M×6−1 | | | | | | ○ | | |
| ~ | | | | | | | ~ | |
| M×(N−1)~M×N−1 | | | | | | | | ○ |
| M×N~M×(N+1)−1 | ○ | | | | | | | |
| M×(N+1)~M×(N+2)−1 | | ○ | | | | | | |
| M×(N+2)~M×(N+3)−1 | | | ○ | | | | | |
| M×(N+3)~M×(N+4)−1 | | | | ○ | | | | |
| M×(N+4)~M×(N+5)−1 | | | | | ○ | | | |
| M×(N+5)~M×(N+6)−1 | | | | | | ○ | | |
| ~ | | | | | | | ~ | |
| M×(N+N−1)~M×(N+N)−1 | | | | | | | | ○ |
| M×(N+N)~M×(N+N+1)−1 | ○ | | | | | | | |

EEPROM (Initial)

| | Value |
|---|---|
| Total Print Number Count 1 | 0 |
| Total Print Number Count 2 | 0 |
| TC Replacement Schedule Copy Number 1 | Y |
| TC Replacement Schedule Copy Number 2 | Y |
| PU Replacement Schedule Copy Number 1 | Z |
| PU Replacement Schedule Copy Number 2 | Z |
| | |

FIG. 7A

EEPROM (After Printing One Copy)

| | Value |
|---|---|
| Total Print Number Count 1 | 1 |
| Total Print Number Count 2 | 1 |
| TC Replacement Schedule Copy Number 1 | Y |
| TC Replacement Schedule Copy Number 2 | Y |
| PU Replacement Schedule Copy Number 1 | Z |
| PU Replacement Schedule Copy Number 2 | Z |
| | |

FIG. 7B

EEPROM (After Printing X Copies)

| | Value |
|---|---|
| Total Print Number Count 1 | X |
| Total Print Number Count 2 | X |
| TC Replacement Schedule Copy Number 1 | Y |
| TC Replacement Schedule Copy Number 2 | Y |
| PU Replacement Schedule Copy Number 1 | Z |
| PU Replacement Schedule Copy Number 2 | Z |
| | |

FIG. 7C

EEPROM (After Printing Y Copies)

| | Value |
|---|---|
| Total Print Number Count 1 | Y |
| Total Print Number Count 2 | Y |
| TC Replacement Schedule Copy Number 1 | Y |
| TC Replacement Schedule Copy Number 2 | Y |
| PU Replacement Schedule Copy Number 1 | Z |
| PU Replacement Schedule Copy Number 2 | Z |
| | |

FIG. 7D

EEPROM (After Replacing TC)

| | Value |
|---|---|
| Total Print Number Count 1 | $Y+\alpha$ |
| Total Print Number Count 2 | $Y+\alpha$ |
| TC Replacement Schedule Copy Number 1 | $Y+\alpha+Y$ |
| TC Replacement Schedule Copy Number 2 | $Y+\alpha+Y$ |
| PU Replacement Schedule Copy Number 1 | Z |
| PU Replacement Schedule Copy Number 2 | Z |
| | |

FIG. 7E

EEPROM (After Printing M Copies and Replacing PU)

| | Value |
|---|---|
| Total Print Number Count 1 | $Z+\beta$ |
| Total Print Number Count 2 | $Z+\beta$ |
| TC Replacement Schedule Copy Number 1 | $Y+\alpha+Y$ |
| TC Replacement Schedule Copy Number 2 | $Y+\alpha+Y$ |
| PU Replacement Schedule Copy Number 1 | $Z+\beta+Z$ |
| PU Replacement Schedule Copy Number 2 | $Z+\beta+Z$ |
| | |

FIG. 7F

IMAGE FORMING APPARATUS

BACKGROUND OF THE INVENTION

1. Field of the Invention

The present invention relates to an image forming apparatus used as a printer, and more particularly, to a lifespan management method for a plurality of components contained replaceably in an image forming apparatus.

2. Description of the Related Art

An image forming apparatus is a printing device, which performs printing by exposing an image to be printed onto an photosensitive drum, developing said image by adherence of toner, and then transferring the visible image to printing paper and fixing the image thereon. Moreover, in the case of color printing, the respective steps described above are carried out for four toners of different colors, namely, Y (yellow), M (magenta), C (cyan) and K (black).

The aforementioned exposure and developing steps are carried out by means of a print unit installed replaceably in the image forming apparatus. This print unit comprises a photosensitive drum, and the like, and hence is a consumable part. Therefore, the lifespan thereof is managed, and when it reaches the end of its lifespan, the print unit must be replaced. Moreover, similar lifespan management is necessary for other consumable parts (or components), such as toner cartridges contained inside the print unit, the fixing device and belts located outside the print unit, and the like.

Conventionally, the lifespan of a component, such as a print unit, is managed by means of lifespan management information, such as a lifespan print copy number or lifespan time period, or the like, for each component, stored in a non-volatile memory (for example, an EEPROM,) in the image forming apparatus. Thereupon, when the number of printed copies reaches the lifespan number of copies, or when the operating time reaches the lifespan time period, a replacement indicator is displayed on the operating panel of the image forming apparatus, thereby prompting the user to replace the print unit.

FIG. 12 is a diagram for describing conventional lifespan management information for a component, as stored in a non-volatile memory. In FIG. 12, the non-volatile memory comprises lifespan management regions, namely: a total print number count region (1); a Y color print unit (PU) print number count region (2)-1; an M color PU print number count region (2)-2; a C color PU print number count region (2)-3; a K color PU print number count region (2)-4; a Y color toner cartridge (TC) print number count region (2)-5; an Mcolor TC print number count region (2)-6; a C color TC print number count region (2)-7; a K color TC print number count region (2)-8; a fixing unit print number count region (2)-9; a belt print number count region (2)-10; and a respective color (Y, M, C, K) print position compensation value management region (3).

Each print number count region (2) comprises an upper region and N lower regions. Each of the lower regions is, for example, a region which counts from 0 to 10,000 copies, and when the number of printed copies reaches 10,000, for instance, the count value of the lower region is reset to zero, whilst the count value of the upper region (including a back-up region) is incremented by +1. In other words, the count value of the upper region counts the 10,000 column, for instance. Moreover, the count up to 10,000 copies is performed in any one of the lower regions, and when the count value in that lower region reaches 10,000 copies, the adjacent lower region counts the next 10,000 copies. In this way, each time a count of 10,000 copies is made in one of the lower regions, the lower region performing the count is changed, in a successive fashion. In this way, in a non-volatile memory (EEPROM) which can only provide a rewriteable count value of the order of 10,000, it is possible to perform counts to a higher number than 10,000.

Furthermore, the lifespan copy numbers corresponding to each component are stored in a separate region of the EEPROM or a separate memory (ROM), or the like, and each time the number of printed copies corresponding to each component is counted, it is compared with the respective lifespan copy numbers.

However, by providing a plurality of lower regions, it becomes necessary to provide, for example, approximately several 10 bytes of memory for each print number count region (2). Therefore, since the non-volatile memory of the image forming apparatus comprises respective print number count regions (2) for each of a plurality of components, in total, a memory capacity of approximately several 100 to 1,000 bytes is required. Minimizing the size of the non-volatile memory contained in an image forming apparatus would contribute to achieving cost reduction for the image forming apparatus.

SUMMARY OF THE INVENTION

Therefore, it is an object of the present invention to provide an image forming apparatus, wherein the lifespan of components can be managed by means of a non-volatile memory of the smallest possible capacity.

In order to achieve the aforementioned object, the image forming apparatus according to the present invention is, for example, an image forming apparatus replaceably containing a plurality of components; comprising: a non-volatile memory for storing a total print copy number (or total print time) updated each time a prescribed number of print copies are made (or each time a prescribed printing time period has elapsed), and a subsequent replacement schedule copy number (or replacement schedule time period) for each component; and a controller for judging the lifespan of each component on the basis of a comparison between the total print copy number (or total print time) and the subsequent replacement schedule copy number (or replacement schedule time period) of each component.

According to the present composition, a lifespan copy number (or lifespan time period) previously determined for each component is added to the replacement schedule copy number (or replacement schedule time period) for each respective component contained in an image forming apparatus, in other words, the total print number (or total printing time) at which the component is replaced, and the resulting value is stored in a non-volatile memory. If the total print number (or total print time) has exceeded the replacement schedule copy number (or replacement schedule time period), then it is judged that the lifespan of the component has expired. In this way, since the amount of information required for managing the lifespan of components is reduced, it is possible to reduce the capacity of the non-volatile memory, and hence reduction in the cost of the image forming apparatus can be achieved.

When a component is replaced, the replacement schedule copy number (or replacement schedule time period) for that component, as stored in the aforementioned non-volatile memory, is updated by adding the previously determined lifespan copy number (or lifespan time period) for that component to the total print number (or total printing time) at which the component was replaced.

BRIEF DESCRIPTION OF THE DRAWINGS

FIG. 4 is a diagram illustrating a method for counting the total print number;

FIG. 5 is a diagram illustrating the relationship between the total print number and the lower region selected;

FIG. 7 is a diagram illustrating a method for counting a replacement schedule copy number;

DESCRIPTION OF THE PREFERRED EMBODIMENTS

Below, embodiments of the present invention are described. However, the technical scope of the present invention is not limited to these embodiments.

Figure 1:
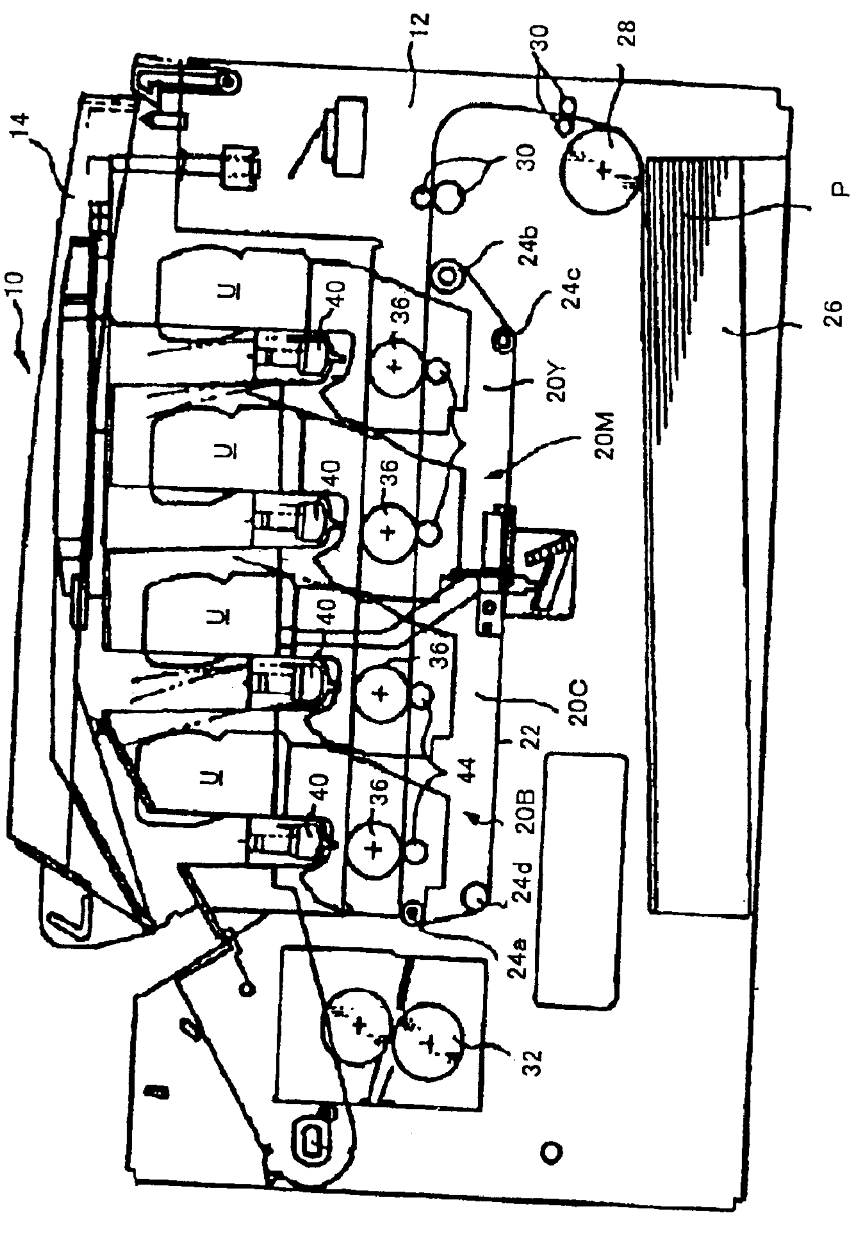
FIG. 1 is a diagram illustrating an example of the internal composition of an image forming apparatus in an embodiment of the present invention.

FIG. 1 is a diagram illustrating an image forming apparatus according to the present embodiment. This image forming apparatus 10 is constituted by a full-color printer. The image forming apparatus 10 has a frame 12, which comprises a top cover 14 and a rear cover (not illustrated). FIG. 1 shows a state wherein the top cover 14 is opened slightly with respect to the frame 12. By opening the top cover 14 and/or the rear cover, it is possible to access the inner components of the image forming apparatus 10 (for example, the print unit).

In FIG. 1, the image forming apparatus 10 comprises four print units 20B, 20C, 20M, 20Y aligned in a linear fashion. An endless printing paper conveyor belt 22 is provided with respect to the four print units 20B, 20C, 20M, 20Y. The printing paper conveyor belt 22 is made from a suitable synthetic resin material, and it passes around the circumferences of four rollers 24*a*, 24*b*, 24*c* and 24*d*. Roller 24*a* is a drive roller, which also functions as an AC charge removing roller for removing electrical charge from the printing paper conveyor belt 22. Roller 24*b* is an idle roller, which also functions as a charging roller for applying electrical charge to the printing paper conveyor belt 22. Rollers 24*c* and 24*d* are both guide rollers. Roller 24*d* is a tension roller for applying suitable tension to the printing paper conveyor belt 22.

A hopper 26 is provided beneath the printing paper conveyor belt 22. A stack of printing paper P is stored in a hopper 26. The printing paper P is pulled out from the hopper 26, one sheet at a time, by a pick-up roller 28, and conveyed to the printing paper conveyor belt 22 by a paper feed roller 30. The printing paper P is then transferred by the printing paper conveyor belt 22 to the print units 20B, 20C, 20M, 20Y, where it is printed or marked. The printed paper P is then conveyed to a fixing unit 32, and subsequently discharged via appropriate guide rollers (not illustrated) to a stacker formed on the upper face of the top cover 14.

Since the printing paper conveyor belt 22 is charged by the idle roller 24*b*, the printing paper P is attracted to, and held on, the printing paper conveyor belt 22, electrostatically, when it is introduced onto the printing paper conveyor belt 22 from side adjacent to the idle roller 24*b*. Thereby, the printing paper P is held in a uniform position on the printing paper conveyor belt 22. On the other hand, since the drive roller 24*a* also functions as a charge removing roller, when the printing paper P passes the position of the drive roller 24*a*, the electrical charge is removed and the printing paper P can be separated readily from the printing paper conveyor belt 22 when discharged on the side adjacent to the driver roller 24*a*, without wrapping around into the lower portion of travel of the printing paper conveyor belt 22.

The four print units 20Y, 20M, 20C, 20B each respectively have the same structure, and respectively contain developers having a yellow toner component, a magenta toner component, a cyan toner component, and a black toner component. Consequently, these print units 20Y, 20M, 20C, 20B respectively print a yellow toner image, magenta toner image, cyan toner image and black toner image onto the printing paper P held and moved by the printing paper conveyor belt 22, and in combination, they form a full-color toner image.

Figure 2:
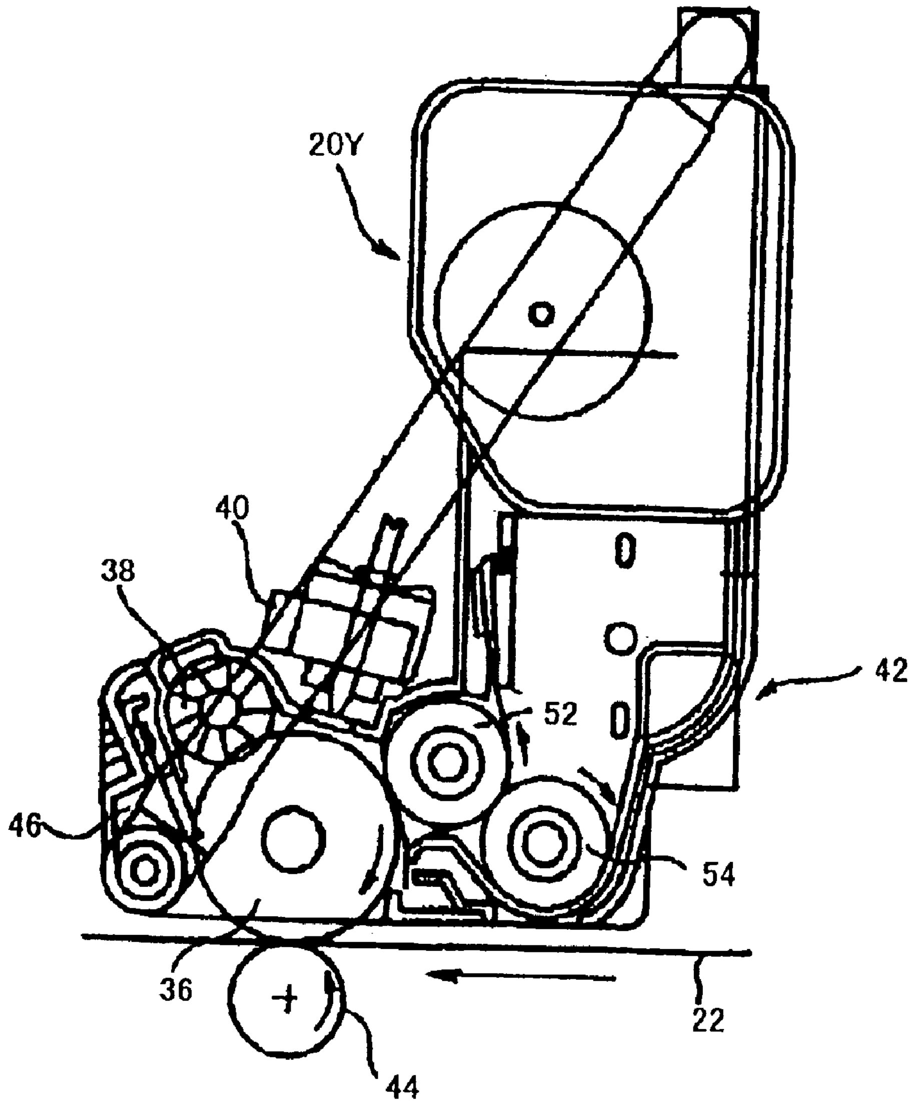
FIG. 2 is a diagram illustrating a single print unit 20Y.

FIG. 2 is a diagram illustrating one print unit 20Y. The print unit 20Y comprises a photosensitive drum 36, a pre-charging unit 38, an optical head (LED beam scanner) 40, a developer 42, a transfer roller 44, and a toner cleaning unit 46.

The pre-charging unit 38 is constituted, for example, by a brush charging unit, roller charging unit, or corona charging unit, and by means of this pre-charging unit 38, a uniform electrical charge is imparted successively to the surface of the photosensitive drum 36. The optical head 40 is disposed to the rear of the pre-charging unit 38 and it writes an electrostatic latent image onto the charged region of the photosensitive drum 36, by means of an LED beam. In other words, the LED beam flashes on and off on the basis of image data obtained from a computer, word processor, or the like, and thereby, an electrostatic latent image is written onto the drum in the form of a dot image.

The electrostatic latent image written onto the photosensitive drum 36 is developed electrostatically in the form of a charged toner image, by means of toner of the prescribed color in the developer unit 42. Thereupon, the electrostatic toner image is transferred electrostatically onto the printing paper P by means of a transfer element 44 positioned below the photosensitive drum 36. The transfer element 44 is constituted by a conductive transfer roller made from a porous body (sponge). This transfer element 44 presses against the photosensitive drum 36 via the printing paper conveyor belt 22, and it supplies an electrical charge of reverse polarity to the charged toner image, onto the printing paper P conveyed by the printing paper conveyor belt 22, thereby causing the charged toner image on the photosensitive drum 36 to be transferred electrostatically onto the printing paper 36.

The printing paper P onto which the electrostatic toner image has been transferred is then separated from the printing paper conveyor belt 22 and fed to a fixing unit 32. Incidentally, after completion of image transfer to the printing paper P, there remains toner adhering to the surface of the photosensitive drum 36 which has not been transferred to the printing paper P. This residual toner is removed by means of a toner cleaning unit 46. The residual toner thus removed is recovered by means of a conveyor screw and hose mechanism (not illustrated).

When the developing unit 42 is installed in the device, the surface of the developing roller 52, in other words, the sleeve thereof, confronts the surface of the body carrying the electrostatic latent image on the photosensitive drum 36. The lower portion of the print unit 20Y forms a developer storage region, and a reset roller 54 is provided therein. The reset roller 54 is driven and rotated in the direction indicated by the arrow in the diagram, when the developing unit 42 operates. The reset roller 54 recovers developer which has not been supplied completely to the photosensitive drum 36 and remains on the developer roller 52.

Moreover, by rotation of the developer roller 52, the developer is conveyed to the surface region confronting the photosensitive drum 36, in other words, the developing region. In order to restrict the amount of developer conveyed to the developer region by the developer roller 52 to a prescribed amount, a developer restricting blade (not illustrated) is attached in a position opposing the developer roller 52.

In the developing unit 42, if, for example, the toner is charged with a negative electrical charge, then a uniform negative charge region is formed on the rotating surface of the photosensitive drum 36 by means of the pre-charging unit 38. When the pre-charged region of the photosensitive drum 36 is illuminated by the LED beam emitted by the optical head 40, the negative electrical charge is removed from the points that are illuminated, thereby forming potential differences. In other words, an electrostatic latent image is written onto the charged region of the photosensitive drum 36, in the form of potential differences. For example, supposing that the electrical potential of the charged region of the photosensitive drum 36 is −600V, the electrical potential of the electrostatic latent image would be reduced to approximately −50V. On the other hand, a negative developing bias voltage of −400V, for example, is applied to the developer roller 52, and hence an electric field is created between the developer roller 52 and the photosensitive drum 36. Due to the electric field between the developer roller 52 and the photosensitive drum 36, the negatively charged toner moves towards the photosensitive drum 36, and adheres to the photosensitive drum 36, thereby developing the image.

Consequently, as illustrated in FIG. 1, by introducing the printing paper P into the printing region from the region of the idle roller 24*b* of the belt conveying means 22, and then passing it successively by the print units 20Y, 20M, 20C and 20B, toner images of four colors are superimposed mutually on the printing paper P, thereby forming a full-color image. The printing paper P is subsequently transferred from the drive roller 24*a* side of the belt conveying means 20 towards the fixing roller 32 formed by a heating roller, whereby the color image is fixed by heating to the printing paper P.

The optical head 40 is attached to the top cover 14. Furthermore, the printing paper conveyor belt 22 and the rollers 24*a*–24*d* are formed integrally as a belt unit, and the transfer element 44 is attached to this belt unit.

Figure 3:
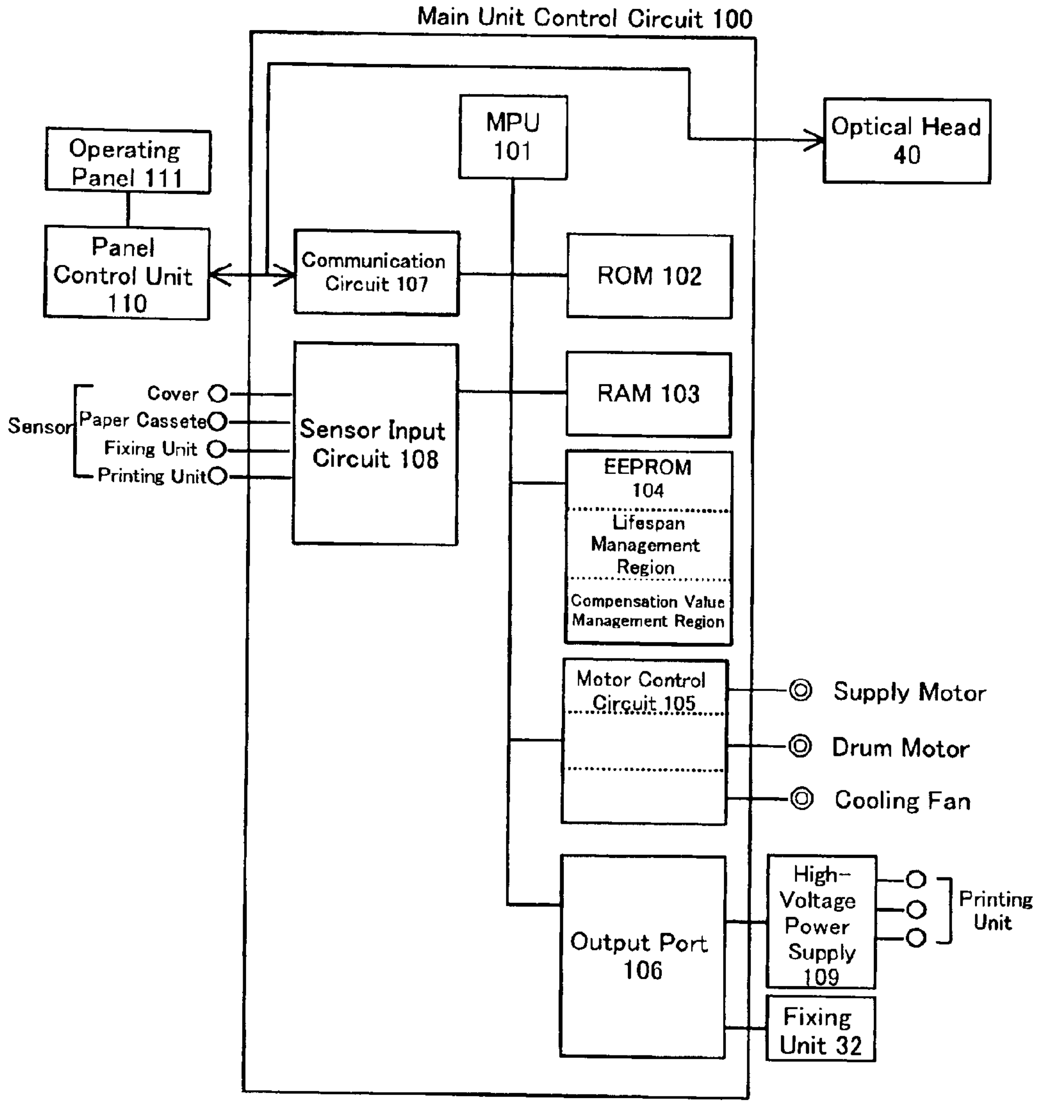
FIG. 3 is a control block diagram of an image forming apparatus in an embodiment of the present invention.

FIG. 3 is a control block diagram of the image forming apparatus according to an embodiment of the present invention. In FIG. 3, the MPU 101 of the main unit control circuit 100 of the image forming apparatus 10 reads out a program and data stored in a ROM 102, and controls each section of the device in accordance with the aforementioned program. For example, the MPU 101 controls operations such as reading and writing to the RAM 103, reading and writing to the EEPROM 104, reading of sensors (not illustrated), motor driving, communication with a panel control unit 110 via a communications circuit 107, and the like. An operating panel 111 is connected to the panel control unit 110. The RAM 103 stores data required when executing the program.

The EEPROM 104 is a non-volatile memory for storing data written even when the power switch is OFF. In the embodiment of the present invention, it stores data such as lifespan management information, and the like, for the components. A motor control circuit 105 drives a supply motor, drum motor and cooling fan, on the basis of the control implemented by MPU 101. Under the control of the MPU 101, an output port 106 controls on/off switching of a high-voltage power supply 109 for supplying high voltage in order to perform operations, such as pre-charging, developing, transfer, and the like, in the print unit 20, and it also controls on/off switching of the optical head 40 and the fixing unit 32. A plurality of sensors connected to the sensor input circuit 108 (not illustrated) detect information such as the presence or absence of printing paper, the passage of printing paper on the printing paper conveyance path, opening and closing of the cover, removal of a print unit 20, the temperature of the fixing unit 32, and the like.

FIG. 4 is a diagram illustrating a method for counting the total number of print copies. In FIG. 4, symbol M is the number counted in a lower region, and it may be any value that is smaller than the rewriteable control value of the EEPROM, for instance, 10000. Moreover, the symbol N is the number of lower regions, which is, for instance, 16. The following processing steps are carried out, each time one printed copy is counted.

(1) A lower region is selected according to the remainder resulting when the upper region 1 for the total print number count is divided by N.

(2) The selected lower region is incremented by +1.

(3) It is determined whether or not the count value of the selected lower region is M, and if it has indeed reached M, then the value of that lower region is reset to ‘0’, and the upper regions 1, 2, 3 are incremented by +1.

FIG. 5 is a diagram illustrating the relationship between the total number of printed copies and the lower region selected. As shown in the diagram, by means of the processing described above, when the number of printed copies is 0 to M−1, lower region 0 is selected, when it is between M and M×2-1, lower region 1 is selected, . . . , and when it is between M×(N×1) and M×N−1, lower region N−1 is selected. Moreover, once M×N copies has been reached, the count returns again to lower region 0.

Returning to FIG. 4, FIG. 4(*a*) illustrates an initial state where the total number of printed copies is zero. The count value in the upper regions 1, 2, 3 (upper regions 2 and 3 being back-up regions) is ‘0’, and the count value in the lower region 0 is ‘0’. FIG. 4(*b*) shows a state where the total number of printed copies is 1. Here, the upper region 1 is ‘0’, and ‘1’ has been counted in the lower region 0. FIG. 4(*c*) shows a state where the total number of printed copies is M−1. Here, the upper region 1 is still ‘0, and the count of the lower region 0 is ‘M−1’. FIG. 4(*d*) shows a state where the total number of printed copies is M. Since the count value of the lower region has reached M, upper regions 1, 2, 3 count ‘1’, and the lower region 0 is reset to ‘0’. FIG. 4(*e*) shows a state where the total number of printed copies is M×N−1. The lower region selected in this state is the lower region N−1 corresponding to the result N−1 obtained when the total print number of M×N−1 is divided by M. Therefore, the count value of the upper regions is ‘N−1’ and the count value of the lower region N−1' is 'M−1'. FIG. 4(*f*) shows a state where the total number of printed copies is M×N. The count value of the upper regions counts up to 'N' and the lower region N−1 is reset to 0.

Figure 6:
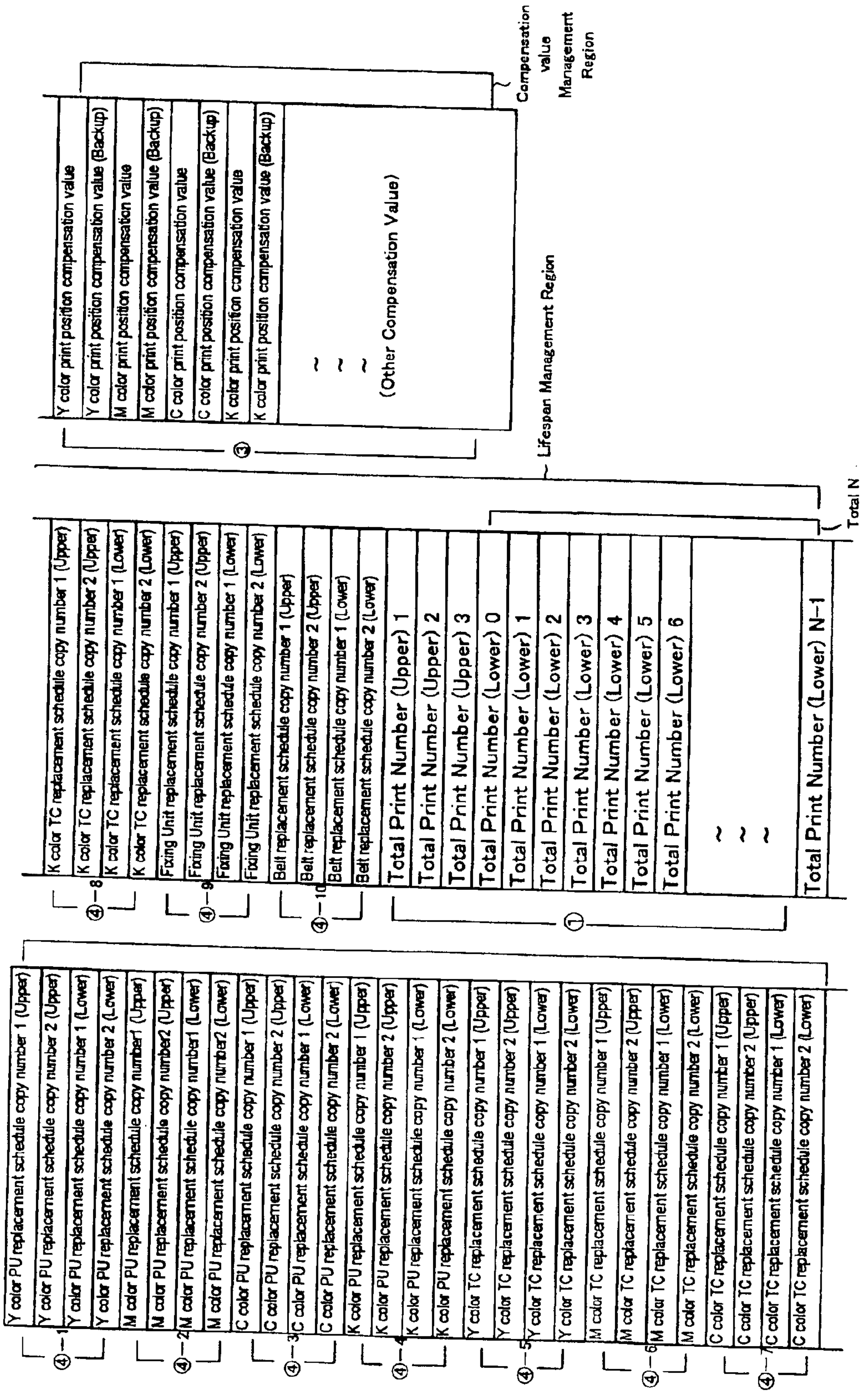
FIG. 6 is a diagram for explaining lifespan management information in an embodiment of the present invention.
Figure 12:
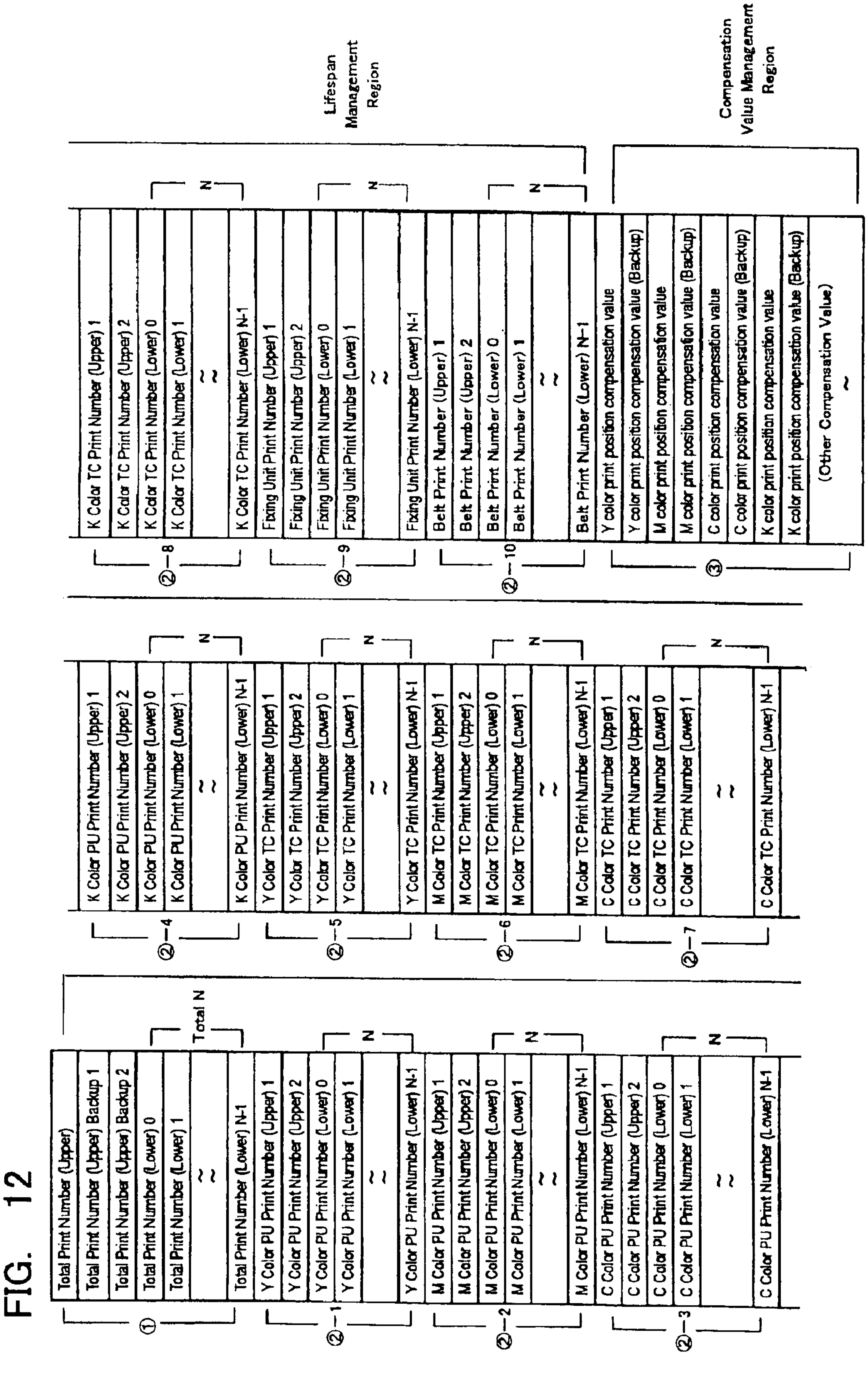
FIG. 12 is a diagram illustrating conventional lifespan management information.

FIG. 6 is a diagram for describing lifespan management information in an embodiment of the present invention. In FIG. 6, the non-volatile memory (EEPROM) 104 comprises a lifespan management region, consisting of a subsequent replacement schedule copy number region (4) for each component and a total print number count region (1), and a compensation value management region (3). The total print number count region (1) depicted here is similar to the composition in the total printed copy number count region (1) shown in FIG. 12. In other words, the total print number count region (1) comprises upper regions 1, 2, 3 and N lower regions 1 to N−1. The upper regions 2, 3 in the total print number count region (1) are back-up regions. Moreover, in the diagram, the subsequent replacement schedule copy number regions (4)-1 to 10 for various components, such as the Y color print unit (PU), M color Pu, C color PU, K color PU, Y color toner cartridge (TC), M color TC, C color TC, K color TC, fixing unit, belt, and the like, each respectively comprise upper regions 1, 2 and lower regions 1, 2. In each case, the upper region 2 and lower region 2 are back-up regions.

The copy number scheduled for next replacement of a component is written into the respective replacement schedule copy number region (4). For example, if the lifespan copy number of a print unit is 30,000 copies, initially, since the total printed copy number is '0', the value '30000' is written into the PU replacement schedule copy number region. Thereupon, when the total printed copy number reaches 30,000, it is judged that the lifespan of the print unit has expired. Subsequently, when the print unit has been replaced, the total printed copy number at the time of replacement is added to the replacement schedule copy number for the print unit, and the resulting value (for example, if the print unit is exchanged at 30,100 copies, then 30,100+30,000='60,100') is overwritten as the subsequent replacement schedule copy number. Thereupon, when the total printed copy number reaches 60,100, it is again judged that the lifespan of the print unit has expired.

In this way, in the present embodiment, in place of the print number count region (2) having a relatively large volume, a replacement schedule copy number region (4) having a relatively small volume is used. More specifically, whereas a conventional lifespan management region for each component might use, for example, 19 unit regions of 16 byte capacity, in the present embodiment, only four such regions are required. A 'unit region' is a general term for an individual upper region or lower region. Consequently, since the capacity of the EEPROM used to record lifespan management information can be reduced, this contributes to reducing the cost of an image forming apparatus.

The lifespan management method adopted in the present embodiment is now described in more detail.

FIG. 7 is a diagram describing a count method for a replacement schedule copy number. FIG. 7(*a*) shows an initial state where the total print number is zero. Here, the total print number is '0'. Moreover, taking the lifespan copy number of the toner cartridge (TC) as 'Y', and the lifespan copy number of the print unit (PU) as 'Z', the value resulting from adding 'Y' to the total print number '0', namely, 'Y', is set in the toner cartridge replacement schedule copy number region, and the value resulting from adding 'Z' to the total print number '0', namely, 'Z', is set in the replacement schedule copy number region of the print unit.

FIG. 7(*b*) shows a state where the total print number is 1, and FIG. 7(*c*) shows a state where the total print number is X, which is a smaller value than 'Y' or 'Z'. FIG. 7(*d*) shows a state where the total print number has reached Y. In this state, a toner cartridge replacement indicator is displayed on the operating panel.

FIG. 7(*e*) is a diagram showing a state where the toner cartridge has been replaced. Since the toner cartridge is replaced when the total print number is Y+α, the value ('Y +α'+'Y') is overwritten in the replacement schedule copy number region for the toner cartridge. Moreover, FIG. 7(*f*) is a diagram showing a state where the print unit has been replaced. If the print unit is replaced, when the total print number is 'Z+β', which exceeds the lifespan copy number of the print unit, then the value ('Z+β'+'Z') is overwritten in the replacement schedule copy number region for the print unit.

Figure 8:
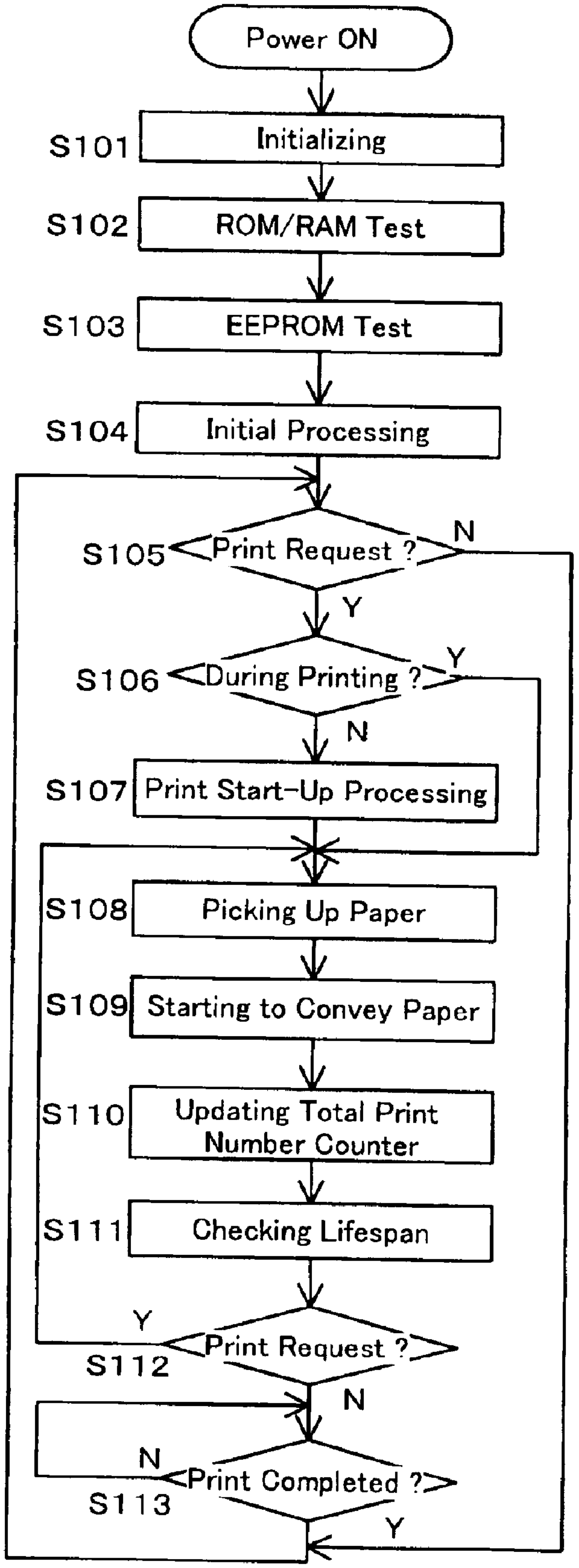
FIG. 8 is a flowchart of print processing in an embodiment of the present invention.

FIG. 8 is a flowchart of print processing in an embodiment of the present invention. When the power supply is turned on, firstly, at step S101, the main unit control circuit 100 is initialized (reset). At step S102, check tests are carried out for the ROM 102 and RAM 103. Thereupon, at step S103, a test of the EEPROM 104 in the main unit control circuit 100 is carried out. At step S104, initial processing is executed. Initial processing involves processing such as rotating the motor and supplying high-voltage power to the print unit 20.

Upon receipt of a print request from the host device at step S105, it is determined, at step S106, whether the device is already engaged in print processing, in other words, whether or not continuous printing is to be performed. If continuous printing is not involved, then at step S107, print start-up processing is implemented. In print start-up processing, for example, the print unit 20 is driven and the fixing unit 32 is heated up.

At step S108, a sheet of paper is picked up from the paper supply unit. When the paper has started to travel at step S109, update processing is carried out for the total print number in the EEPROM 104 of the main unit control device 100, at step S110. Thereupon, at step S111, lifespan check processing is carried out. Details of total print number update processing and lifespan check processing are described below.

At step S112, if there is a further print request, then steps S105 to S111 described above are repeated. If there is no print request at step S112, then the printing operation terminates at step S113.

Figure 9:
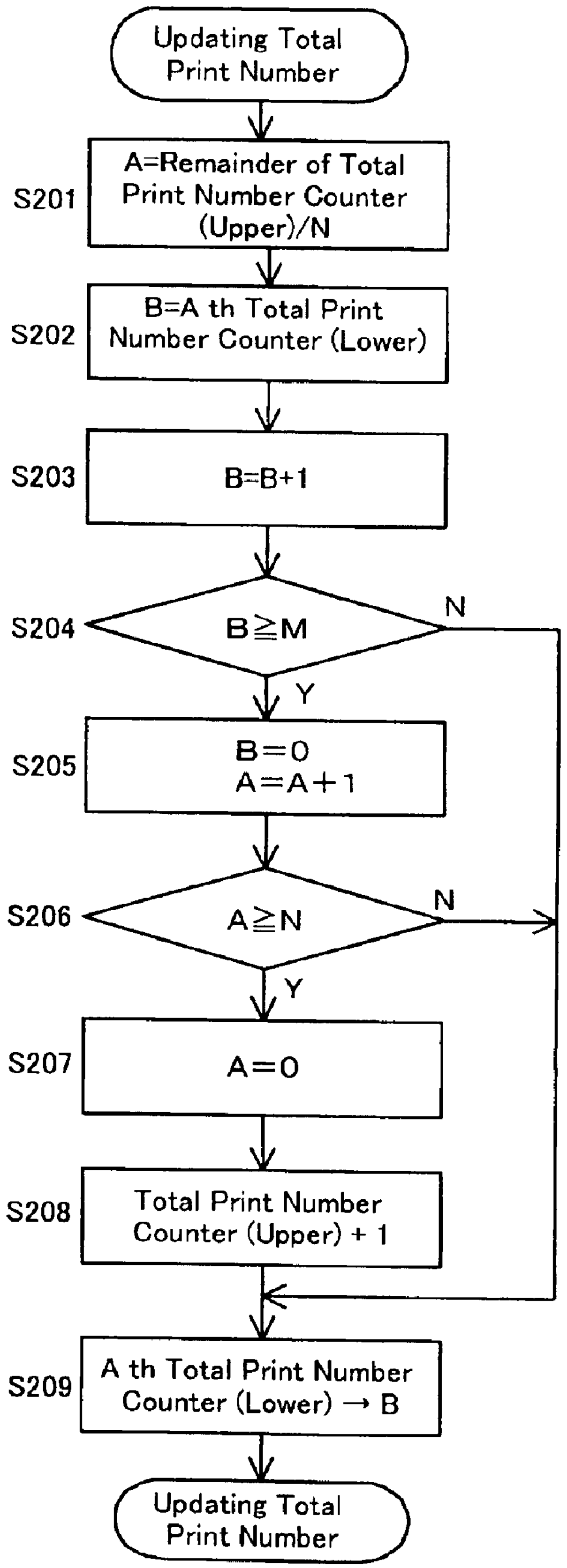
FIG. 9 is a flowchart of total print number update processing.

FIG. 9 is a flowchart of update processing for the total print number. At step S201, firstly, the value of the upper region of the total print number count region is divided by the number of lower regions N, and the remainder from this calculation is taken as A. At step S202, the Ath lower region is selected and the count value of this region is set as B. At step S203, the count value B is incremented by +1. At step S204, it is judged whether the +1 incremented count value B is greater than the upper count limit M for the lower region (for example, 10,000). If the value is less than M, then at step S209, the +1 incremented count value B is written into the Ath lower region. If the value is equal to or above M, then at step S205, the count value B in the Ath lower region is reset to '0', and the value A is incremented by +1. At step S206, it is determined whether the +1 incremented value A is equal to or greater than the number N of lower regions. If the value is less than N, then the adjacent A+1th lower region is selected. At step S209, the +1 incremented count value B is written into the Ath lower region. If the value is equal to or above B, then at step S207, value A is reset to '0', whilst the count value of the upper region is incremented by +1. Thereupon, at step S209, the +1 incremented count value B is written into the Ath lower region.

By means of this update processing, each time that one of the lower regions counts up to its upper count limit, the lower region counting the print number is shifted to the adjacent lower region. Moreover, if the lower region is shifted, then the count value of the upper region is also incremented.

Figure 10:
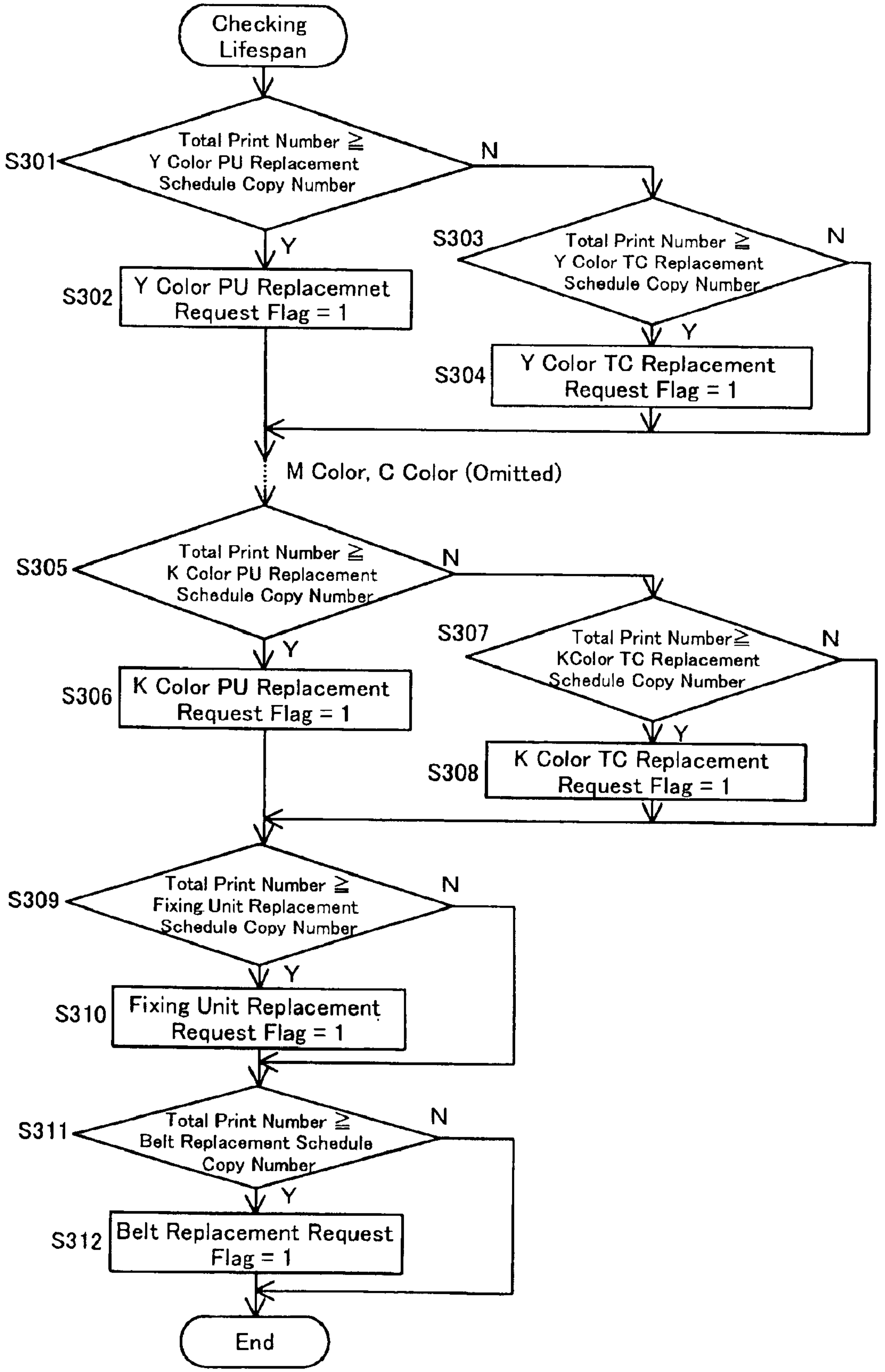
FIG. 10 is a flowchart of lifespan check processing.

FIG. 10 is a flowchart of lifespan check processing. The components may be subjected to the lifespan check processing described below, in any desired sequence. At step S301, firstly, the lifespan of the Y color print unit (PU) is checked. In other words, it is determined whether or not the total print number has reached the Y color PU replacement schedule copy number. If the replacement schedule copy number has been reached, then at step S302, the Y color PU replacement request flag is set to '1', and a replacement indicator is displayed on the operating panel. If the total print number is less than the replacement schedule copy number, then at step S303, the lifespan of the Y color toner cartridge (TC) contained in the Y color PU is checked. In other words, it is judged whether or not the total print number has reached the Y color TC replacement schedule copy number. If the replacement schedule copy number has been reached, then at step S304, the Y color TC replacement request flag is set to '1', and a replacement indicator is displayed on the operating panel. If the total print number is less than the replacement schedule number, then lifespan check processing similar to that described above is carried out respectively for the M color, C color and K color print units (steps S305 to S308). When a print unit is replaced, since the toner cartridge is also replaced together with the print unit, it is not necessary to carry out a toner cartridge lifespan check, when the print unit replacement request flag is set.

Figure 11:
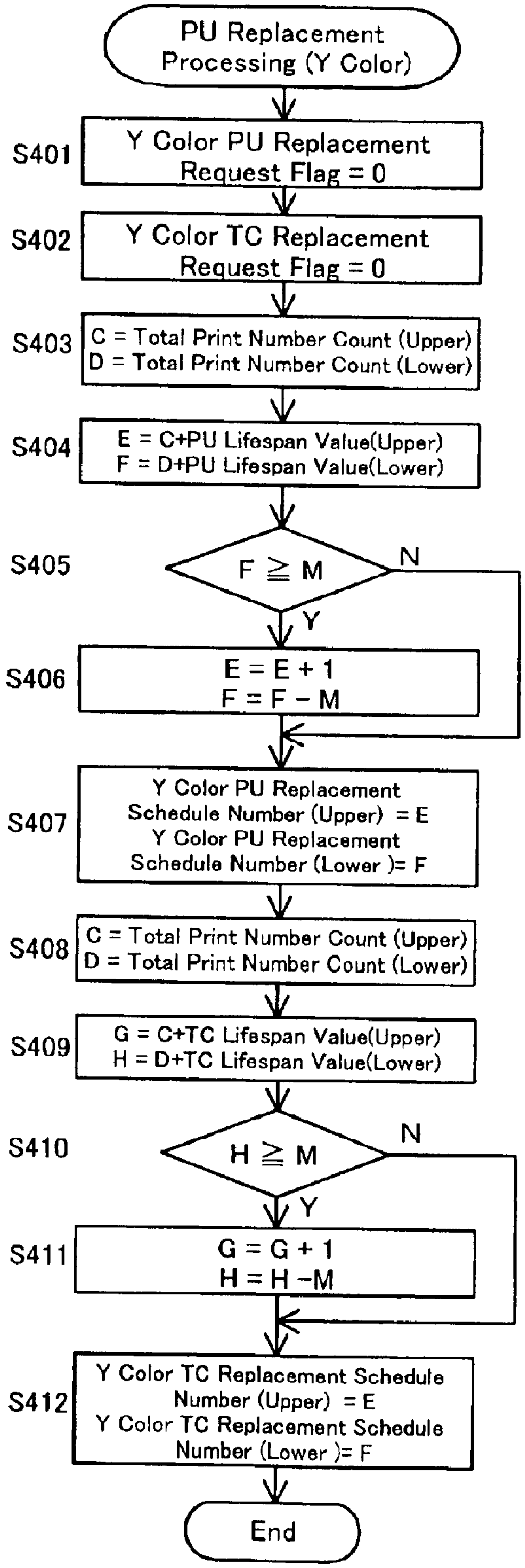
FIG. 11 is a flowchart of replacement schedule copy number rewrite processing.

Following the print units and toner cartridges, lifespan check processing is conducted in a similar fashion for the fixing unit (steps S309, S310), whereupon lifespan check processing for the belt (steps S311, S312) is carried out. FIG. 11 is a flowchart of replacement schedule copy number rewrite processing. This processing sequence is carried out when a component is replaced. FIG. 11 is a flowchart of PU replacement schedule copy number rewrite processing corresponding to replacement of a print unit (PU), for example. At steps S401 and S402, the Y color PU replacement request flag and the Y color TC replacement request flag are respectively reset to '0'. Thereby, the replacement indicator displayed on the operating panel is cancelled. At step S403, the count value C in the upper region of the total print number count region at the time of the replacement is read out, along with the count value D in the lower region thereof. At step S404, the print unit lifespan copy number is added to the count value C, D at the time of replacement. Specifically, of the lifespan copy number, the value of the columns exceeding the upper count limit M is added to count value C (the resulting value being called value E), and the value of the columns equal to or lower than the upper count value M are added to count value D (the resulting value being called value F). For example, if the lifespan copy number of a print unit is 35,000 and the upper count limit M of the lower region is 10,000, then E=C+3, and F=D+5000.

At step S405, it is determined whether or not value F is equal to or greater than the upper count limit M. If it is equal to or greater than M, then at step S406, value E is incremented by +1, and value F is reduced by value M. If value E is less than value M, then the sequence proceeds to step S407. At step S407, it is determined that value E is a value corresponding to the upper region of the replacement schedule copy number for the Y color PU, and that value F is a value corresponding to the lower region thereof, these values being written to the corresponding regions of the EEPROM 104. Moreover, processing similar to that described above is also carried out with respect to the Y color TC replacement schedule copy number. In other words, by adding the Y color lifespan copy number to the total print number values C, D at the time of replacement, a count value G corresponding to the upper region of the subsequent Y color TC replacement schedule copy number and a count value H corresponding to the lower region thereof are determined and written into the EEPROM 104 (step S408 to S412). Moreover, processing similar to that described above is also carried out with respect to the M color, C color and K color print units and toner cartridges, and the fixing unit and belt.

In the present embodiment of the invention, each time that a print is made, the count value of the EEPROM 104 is updated by +1, but it is also possible to update the count value by more than one, each time a certain number of prints have been made. Moreover, in the present embodiment of the invention, the lifespan of each component is judged on the basis of the number of printed copies, but instead of this, it is also possible to judge lifespan on the basis of printing time. Specifically, it is possible to use 'total printing time' and 'replacement schedule time' in place of 'total print number' and 'replacement schedule copy number'. The scheduled replacement time is obtained by adding a lifespan time period previously determined for each component, to the total printing time at the point of replacement. Thereupon, the total printing time is updated after each passage of a prescribed printing time period, and the lifespan of each component is judged. The prescribed printing time period may be, for example, the period of time taken by the photosensitive drum to rotate through a prescribed angle.

The relationship between the print number and printing time is virtually proportional, but this proportional relationship varies with the size of the printing paper. This is because the printing time for a single sheet of paper varies with the size of the paper. Consequently, in an image forming apparatus capable of printing onto a plurality of paper sizes, it is possible to achieve more accurate lifespan judgement using print number, than lifespan judgement based on printing time.

Furthermore, lifespan judgement based on print number and lifespan judgement based on printing time may also be used in parallel. In this case, it is possible to adopt a system, whereby a replacement indicator is displayed on the operating panel if either method indicates that a component lifespan has been reached, or a replacement indicator is displayed on the operating panel if both methods indicate that a lifespan has been reached.

The scope of the present invention is not limited to the embodiment described above, and it also extends to the inventions described in the claims and equivalents to same.

According to the present invention described above, a lifespan copy number (lifespan time period) previously determined for each component is added to the replacement schedule copy number (replacement schedule time) of respective components contained in an image forming apparatus, in other words the total print number (total print time) at the time of replacement of a component, and the resulting value is recorded in a non-volatile memory. Thereupon, it is judged that a component lifespan has expired, each time that the total print number (total print time) exceeds the replacement schedule copy number (replacement schedule time period). Thereby, since the amount of information required for component lifespan management is small, the capacity of the non-volatile memory can be reduced, and hence cost reductions in the image forming apparatus can be achieved.

What is claimed is:

1. An image forming apparatus containing a plurality of replaceable components; comprising:

a non-volatile memory for storing a total print copy number updated each time a prescribed number of print copies are made, and a subsequent replacement schedule of copy number for each component; and a controller for judging whether each component should be replaced when said total print copy number is equal to or greater than said corresponding subsequent replacement schedule copy number of each component, wherein, when one of the components is replaced, the subsequent replacement schedule copy number for said component as stored in said non-volatile memory is updated to a value obtained by adding a lifespan copy number previously determined for said component to the total print copy number at the time of replacement.

2. An image forming apparatus containing a plurality of replaceable components; comprising:

a non-volatile memory for storing a total printing time updated each time a prescribed printing time period has elapsed, and a subsequent replacement schedule time period for each component; and a controller for judging whether each component should be replaced when said total printing time is equal to or greater than said corresponding subsequent replacement schedule time period of each component, wherein, when one of the components is replaced, the subsequent replacement schedule time period for said component as stored in said non-volatile memory is updated to a value obtained by adding a lifespan time period previously determined for said component to the total printing time at the time of replacement.

3. The image forming apparatus according to claim 2, wherein said component is a print unit, a toner cartridge, a fixing unit, or a belt.

4. The image forming apparatus according to claim 1, wherein said component is a print unit, a toner cartridge, a fixing unit, or a belt.

* * * * *